United States Patent [19]

Gineris

[11] Patent Number: 5,285,384
[45] Date of Patent: Feb. 8, 1994

[54] PAYROLL TRUST CHECK SYSTEM

[76] Inventor: Angelo J. Gineris, 6601 Coors Blvd. NW., Albuquerque, N. Mex. 87120-2733

[21] Appl. No.: 19,307

[22] Filed: Feb. 18, 1993

[51] Int. Cl.$^5$ .............................................. G06F 15/30
[52] U.S. Cl. ..................................... 364/408; 235/379
[58] Field of Search .................. 364/406, 408; 235/379

[56] References Cited

U.S. PATENT DOCUMENTS

| | | | |
|---|---|---|---|
| 3,988,571 | 10/1976 | Blair et al. | 235/379 |
| 4,321,672 | 3/1982 | Braun et al. | 364/408 |
| 4,637,634 | 1/1987 | Troy et al. | 364/408 |
| 4,731,524 | 3/1988 | Brooks | 235/379 |
| 4,733,060 | 3/1988 | Dono et al. | 235/379 |
| 4,750,121 | 6/1988 | Halley et al. | |
| 4,890,228 | 12/1989 | Longfield | |
| 4,985,833 | 1/1991 | Oncken | |
| 5,117,356 | 5/1992 | Marks | 364/406 |
| 5,138,549 | 8/1992 | Bern | |
| 5,187,351 | 2/1993 | Clary | 235/379 |
| 5,198,975 | 3/1993 | Baker et al. | 364/406 |

*Primary Examiner*—Donald E. McElheny, Jr.
*Attorney, Agent, or Firm*—Jacobson, Price, Holman & Stern

[57] ABSTRACT

A system and method for isolating and automating the transfer of tax withholdings to the appropriate tax withholding accounts. A check is provided which on its face indicates the withholding accounts and amounts withheld for each withholding account. The Payroll Trust Check (PTC) is unique in that it clears the banking system with multiple payees. Other than the employee portion (net amount), these payee amounts are accumulated in trust accounts and forwarded to the U.S. Treasury and/or other collection agencies on a daily basis. A sequence of bar codes are also printed on the check to identify the particular withholding accounts. When the check is presented for processing, the information on the front of the check is micro-coded, as is normally the case. The additional information related to the withholding accounts and amounts are also micro-coded. The check is optically scanned to read the micro-coded data and the bar code data. On the basis of the bar code data, which includes the employer's account number, a processing computer determines the actual destination to which the withholding amounts are to be electronically transferred into the proper withholding account.

8 Claims, 4 Drawing Sheets

FIGURE 2

PAYROLL TRUST CHECK SYSTEM

FIELD OF THE INVENTION

The present invention relates to a payroll trust check system in which tax and other withholdings in payroll checks are automatically isolated, accumulated and transferred to the appropriate tax withholding account.

BACKGROUND OF THE INVENTION

The current methods of tax revenue collection are susceptible to nonpayment, delays, and errors, and make it quite difficult to reconcile withholdings. The actual transfer of funds representing withholding amounts, whether transferred electronically or by mail, often does not occur or is delayed days or even months after a payroll check is issued and the tax withheld. This nonpayment and/or time lag is accountable for 50 to 100 billion dollars in tax revenue loss per year to the U.S. Treasury.

The payroll check has been in widespread use for almost 50 years. It provides a mechanism for most employers to disburse their payroll efficiently. The employer computes the employee's net pay, which is the gross pay less deductions for items such as FICA, federal income tax, state income tax, local income tax, insurance premiums, retirement deductions, etc., and records these amounts on a standard payroll check stub. The payroll check contains only the net amount (gross amount earned by the employee less all deductions).

Banks collect and transfer federal withholding tax payments from employers. The employer or their designated agent fills out a particular Internal Revenue Service (IRS) form. This IRS form and check for the amount specified on the form are "deposited" at a Federal Reserve Bank or a designated bank. The withheld funds have a due date defined according to a complicated schedule depending on the size of the business and other factors.

The funds for federal income tax withholdings are transferred electronically to the New York Federal Reserve Center and the information on the IRS forms are electronically forwarded to the IRS Headquarters in Washington, D.C. The information on the forms forwarded to Washington must be reconciled with the funds electronically transferred to the New York Federal Reserve Center. Reconciliation is performed in the aggregate. No independent sources are checked to determine the accuracy, completeness or timeliness of the deposited federal income tax withholding information for individual taxpayers. In some instances, such as for the payroll of large corporations, intermediate parties process the forms and deposit the funds for the employer into the Federal Reserve bank system.

The state government income tax collection agencies use similar procedures as the federal government, and suffer similar nonpayment and/or delayed payment problems.

In addition, the IRS collects up to 11 different types of withholding, from standard income tax withholding and FICA to Railroad Retirement and Federal Retirement amounts. To make these transfers, the IRS requires a specific 7 data item format for electronic transfer of the withheld amounts and account numbers depending on which type of tax the withholding amount represents.

The present invention is designed to simplify the tax withholding procedure and consolidate it into a single computer transaction for each employer on a daily basis.

There are very few systems and methods for multiple payees known. U.S. Pat. No. 1,198,936 and U.S. Pat. No. 1,240,255 relate to a multiple payee, carbon paper-based deposit slip. All of the payees denoted on the multiple payee slip must belong to the same financial institution for the deposit slip to be effective. This type of device has very little practical application in the computerized society of today. Moreover, the deposit slip does not embrace the allocation and/or payment of withholding taxes and is not negotiable between banks or financial institutions.

There is no system or method heretofore known in which computer processing, image processing and telecommunications are employed to achieve multiple account transfers of taxes and other withholdings from a single payroll trust check.

SUMMARY OF THE INVENTION

It is a primary objective of the present invention to isolate, automate, and thereby expedite, the accurate and complete transfer of tax and other withholdings in an employer's payroll to the appropriate tax withholding accounts.

It is still another object of the present invention to provide a system and method for automating the transfer of tax and other withholdings in an employer's payroll by way of a new check processing procedure.

Briefly, the present invention relates to a system and method for automating the transfer of income tax and other withholdings to the appropriate tax withholding accounts. A new type of check is provided which on its face indicates the withholding accounts and amounts withheld for each withholding account. A sequence of bar codes are also printed on the check to identify, in the same sequence, the particular withholding accounts. When the check is presented for processing, the information on the front of the check is micro-coded, as is normally the case. However, the additional information related to the withholding accounts and associated amounts are also microcoded. Then the check is optically scanned to read the micro-coded data and the bar code data. On the basis of the bar code data, which includes the employer's account number, a processing computer determines the actual destination to which the withholding amounts are to be electronically transferred into the proper withholding account.

In an alternative embodiment, the system and method of the present invention may perform automatic withholding transfers for "direct deposit" payroll transactions.

In both cases, the income tax and other withholdings may be transferred to the proper withholding account much quicker than the systems and methods heretofore known. As a result, reconciliation is made much easier.

The above and other objects and advantages will become more readily apparent when reference is made to the following description taken in conjunction with the accompanying drawings.

BRIEF DESCRIPTION OF THE DRAWINGS

FIG. 2 is plan view of a multiple payee payroll check according to the present invention.

DETAILED DESCRIPTION OF THE PREFERRED EMBODIMENTS

Figure 1:
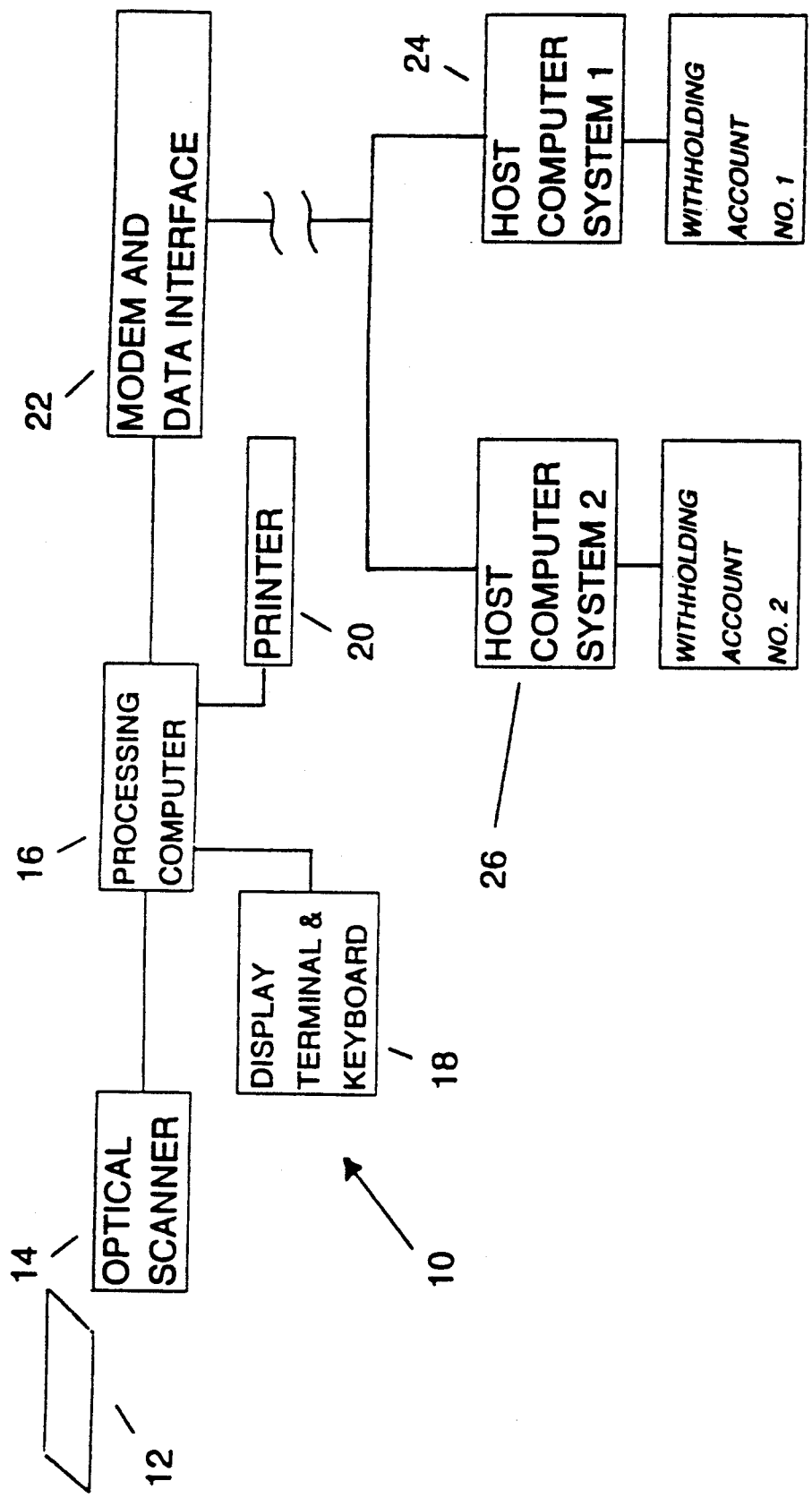
FIG. 1 is a block diagram of the payroll trust check system according to the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Referring first to FIG. 1, the payroll trust check system is shown generally at 10. The system 10 comprises a payroll check 12, which will be described in greater detail in conjunction with FIG. 2; an optical scanner 14; a processing computer 16 with associated peripheral devices such as a display terminal and keyboard 18 and a printer 20; and a modem and RS 232 interface 22 to transfer information to one or more hosts shown at 24 and 26.

Generally, the payroll check 12 is optically read by the optical scanner and the data read therefrom is converted to digital computer data. This data is processed in the computer 16 and the tax withholding amounts and account destinations are generated for transfer through the standard data transfer interface 22 to one or more of the host systems 24 and 26. The processing computer 16 may be a standard 286, 386 or 486 IBM-compatible processor or an APPLE compatible processing system. While a check is processed, the status may be observed on the display terminal 18 and/or printer 20.

Figure 2:
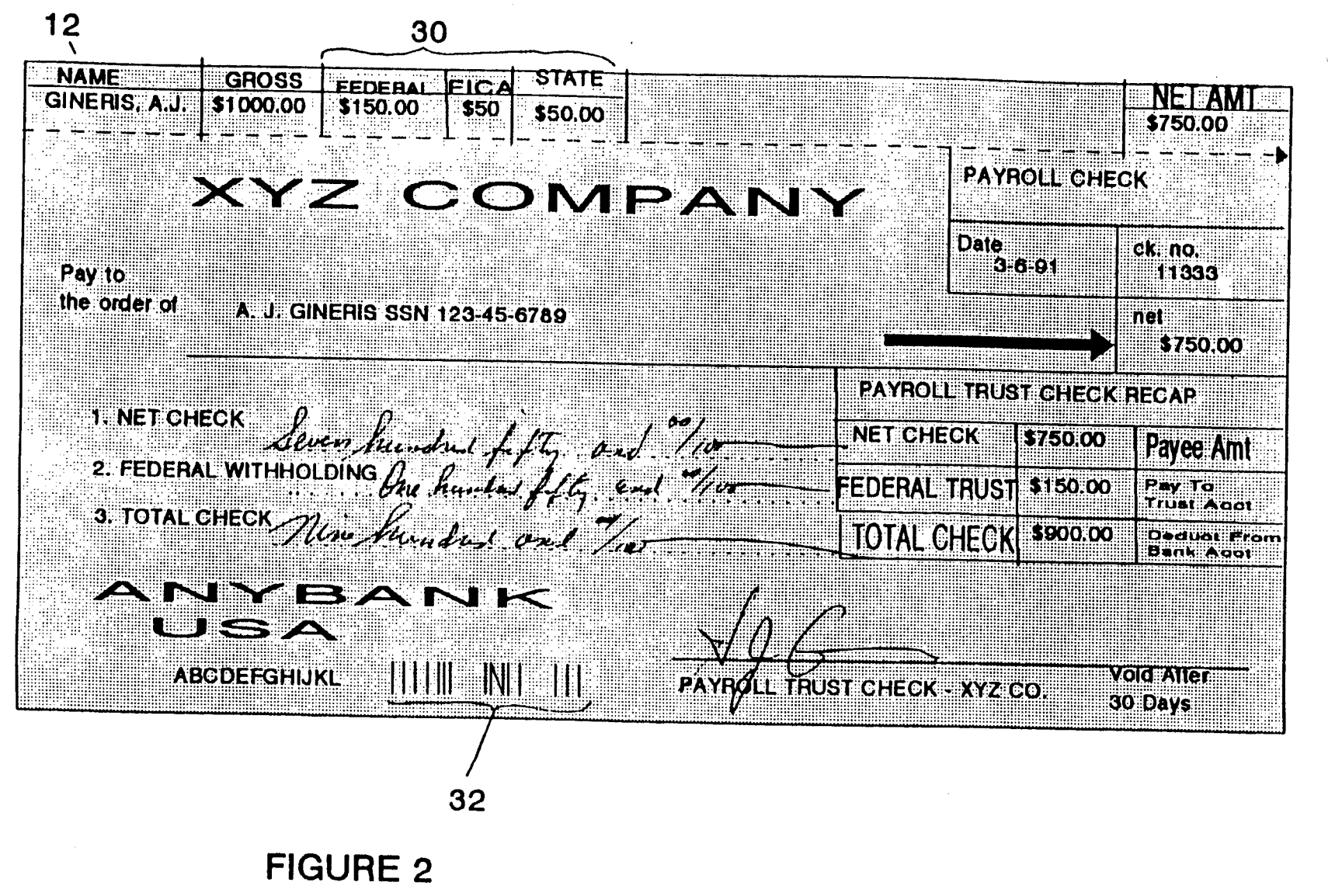

Turning now to FIG. 2, the payroll check 12 will be described in greater detail. The Payroll Trust Check (PTC) is unique in that it clears the banking system with multiple payees. Other than the employee portion (net amount), these payee amounts are accumulated in trust accounts and forwarded to the U.S. Treasury and/or other collection agencies on a daily basis. The check 12 contains information usually found on a payroll check and also information on the check stub, kept by the employee.

As with most checks, the account holder's name, address and other related information is provided on the face of the check. Noteworthy are the blocks 30 along the top of the check for withholding amounts corresponding to the employer's requirements. There may be, at a maximum, 11 federal withholding account types associated with the amounts specified in the blocks. Of course, there may also be blocks for state and local tax withholdings. Moreover, other withholding accounts may be included, such as, for example, retirement accounts.

Each block is bar-coded using visual or ultraviolet ink with predetermined identifying sequences. The bar codes are shown at the bottom of the check at 32. The actual destination of the amounts shown in the blocks depends on the particular employer and the type of withholding. Employers pay withheld tax and other withholdings to assigned institutions. Therefore, the destination is defined by the account number of the employer on the check and the coded withholding accounts. Moreover, the bar codes are arranged in the same sequence that the amounts in the blocks 30 are micro-coded onto the check during processing by a bank, the importance of which will become more readily apparent hereinafter. Again, the number of individual withholdings may vary with employer and employee. All of the checks for a particular employer have pre-printed block spaces and bar codes according to the maximum number of withholding accounts for that particular employer. Amounts will be filled in or left blank depending on the employer and employee. Consequently, the check shown in FIG. 2 is an oversimplified example. It should be understood that there may be several more withholding blocks and corresponding bar codes.

Typically, other types of information are included on the check, and at the very least a breakdown of each withholding amount from the gross amount is shown. This allows the processing bank personnel to generate the proper micro-codes which are printed on the check. To avoid potential interference with the micro-codes, the bar codes may be printed with invisible ultraviolet ink.

Figure 3:
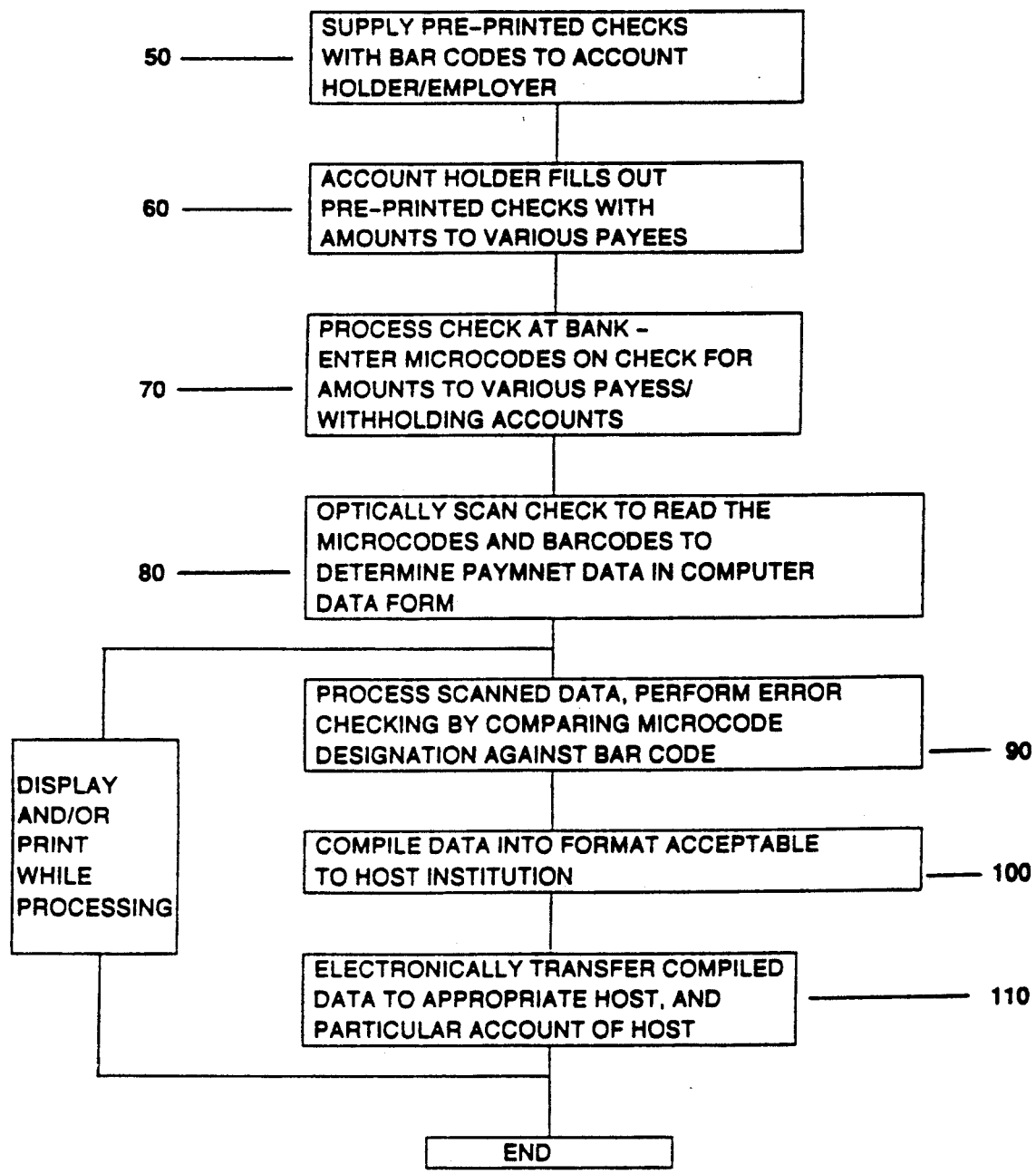
FIG. 3 is a flow chart diagram illustrating the operation of the payroll trust check system according to the preferred embodiment of the present invention.

Now, with reference to FIG. 3 and continuing reference to FIG. 2, the operation of the system will be described. First, as represented by step 50, the check is pre-printed and supplied to account holders in the same way that standard checks are printed today. The account holder (employer) performs the payroll functions as usual and fills out the checks in step 60. The filled-out payroll check is delivered to the employee/payee.

The employee/payee may endorse and deposit and/or cash this check at his/her own bank or possibly at the employer's bank. Nevertheless, the check is micro-coded in step 70 and eventually is presented to the employer's bank. This micro-coding procedure is well known in the art. Basically, the check processing service personnel read the check and enter micro-codes representing the amounts and withholding account types for the information on the front of the check. The micro-codes are normally printed on the front of the check. As mentioned above, the sequence in which the micro-codes are printed is known a priori so that the bar codes are printed on the check corresponding to that sequence. This allows a one-to-one correspondence between the amounts micro-coded and the ultimate destination where these amounts must be electronically transferred defined by the bar codes. New micro-codes are added for withholding accounts. The account number of the payor is also normally included in the micro-coded data.

After the micro-codes are entered on the check, the check is optically scanned in the optical scanner 14 in step 80 to read the micro-codes and the bar codes for generating payment data in computer data form. The visible or ultraviolet bar codes are used to coordinate the micro-coded data on the check including the account number. This data is transferred to the processing computer 16.

At step 90, the scanned data is processed and an error check is made by comparing the bar codes and the micro-coded amounts to be sure there is a match. No electronic fund transfers are made if an error is detected. According to the employer's account number and the information contained in the bar codes, the processing computer determines the appropriate destination for each of the withholding amounts. To this end, the processor is controlled by software designed to compile the information contained in the bar codes, the account number, and the amounts, and "look-up" the destinations in memory based on the account number and previously stored destination data for that account number.

Next, in step 100, the data must be compiled in the proper manner that is acceptable for the particular host institution where funds are to be transferred. It should be understood that withholdings from one check may be required for transfer to more than one host, and the acceptable format for that host may be different than other hosts. For example, the New York Federal Reserve Center of the IRS has a certain acceptable format. Other institutions may have different formats. Each of these formats is stored in the processing computer 16.

Moreover, a particular host may have more than one withholding account, or withholding accounts may be located in different hosts. This is denoted by the hosts 24 and 26 in FIG. 1.

Once compilation into the proper format(s) are made, the data is ready for electronic transfer to the appropriate destination, as represented by step 110. Usually, electronic funds transfers occur during the night. Therefore, the transactions for the day are accumulated and stored. Then, all electronic funds accumulated during the day, are transferred that night.

The procedures of steps 90-110 may be observed through operator inquiry by the display terminal and keyboard 18. Error messages may be displayed and allow an operator to quickly attend to handling of checks with withholding account number inconsistencies. In addition, the printer 20 may be a standard commercially available printer to provide hard copy output of the processing of a check and any errors discovered, and ultimately to provide a permanent record of transactions.

Figure 4:
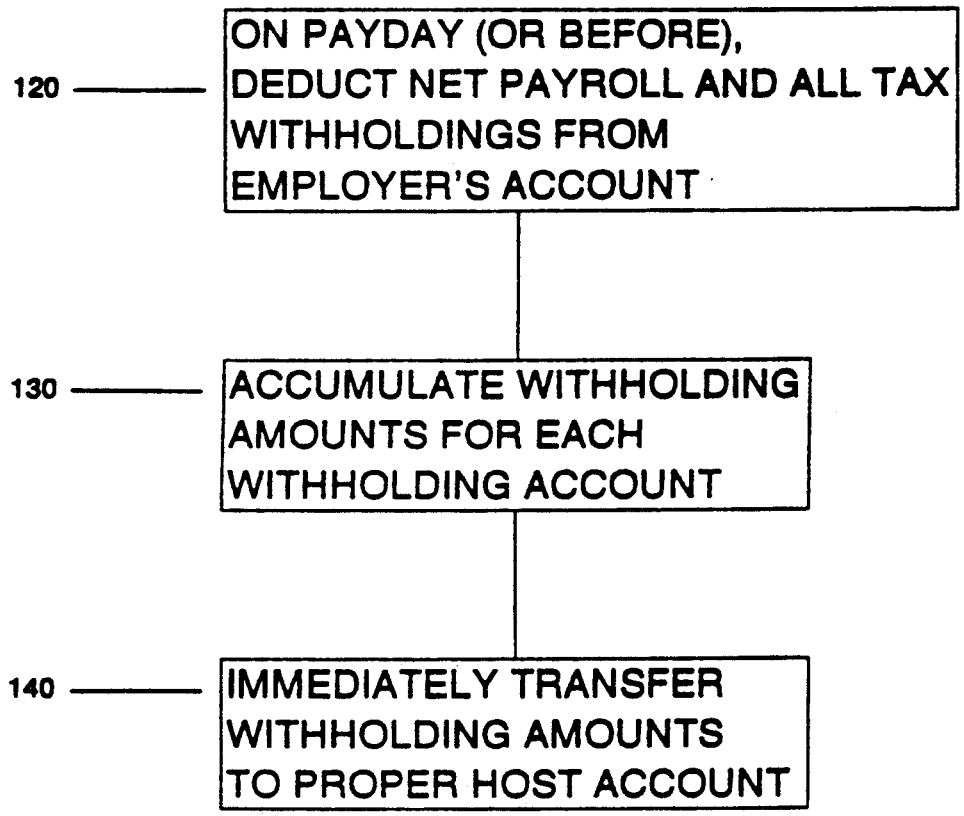
FIG. 4 is a flow chart diagram illustrating the operation of payroll trust check system according to an alternative embodiment of the present invention.

FIG. 4 is a flow chart diagram illustrating the embodiment in which an employer's payroll is paid to employees by way of electronic "direct deposit". In this case, the employees who are paid with direct deposit receive a pay check stub on "pay day", and the funds are electronically transferred to the employees bank account. The information of the pay checks to these employees is available in the employer's bank computer. Therefore, no optical reading of pay checks is necessary to retrieve the withholding information.

In step 120, at the employer's bank the net payroll is deducted from the employer's account as well as all tax withholdings for each of the employees. Next, in step 130, the withholding amounts for each of the withholding accounts are accumulated. Finally, at the end of the day, and usually that night, the amounts for each withholding account are electronically transferred to the appropriate host depending on the destination of the withholdings, as shown by step 140. Again, the processing computer 16 will store, indexed to the employer's account number, the particular destinations of each withholding account accommodated by that employer. Consequently, the tax withholdings are transferred to the proper account the same day as the payroll is electronically transferred to the accounts of the employees. Of course, if an employer pays some employees with payroll checks 12 and others by electronic transfer, then the withholdings for the payroll checks 12 will not be transferred until those checks are received by the employer's bank for presentment.

It is to be understood that the above description is intended by way of example only and is not intended to limit the present invention in any way except as set forth in the following claims.

I claim:

1. A method of automatically transferring payroll withholdings comprising the steps of:
   printing a plurality of bank checks each having printed thereon spaces for amounts for each of a plurality of withholdings associated with corresponding withholding accounts, and bar codes printed thereon representing the particular withholding accounts corresponding to the spaces for the plurality of withholdings;
   supplying a plurality of said bank checks to an employer;
   filling out the bank check, including the amounts representing said plurality of withholdings;
   processing checks endorsed by the payee including the steps of micro-coding the data on the face of the check including the plurality of withholdings;
   optically scanning the checks to read the micro-codes and bar codes and converting the micro-codes and bar codes to digital data for processing by a computer;
   processing the digital data to determine on the basis of the account number of the check, micro-codes and bar codes, the destination of a host system to which the withholding amounts for each withholding account are to be transferred;
   converting the withholding amount and withholding account information into a data format acceptable to each host system to which the withholding amounts are to be transferred; and
   electronically transferring the withholding amount and withholding account information to the appropriate host system.

2. The method of claim 1, and further comprising the step of accumulating withholding amounts obtained from a plurality of checks during one work day, and wherein the step of transferring comprises the step of transferring accumulated withholding amounts during the night of that work day.

3. The method of claim 1, wherein the step of printing comprises printing the bar codes in ultraviolet ink so as to be invisible to the human eye but readable by an optical scanner.

4. The method of claim 1, wherein certain portions of an employer's payroll are paid by electronic direct deposit, the method of further comprising the steps of:
   deducting net payroll and withholdings from the employer's account;
   accumulating withholding amounts for each withholding account for the entire portion of the payroll paid by direct deposit; and
   wherein the step of electronically transferring comprises the step of transferring the withholding amounts for each withholding account associated with the direct deposit portion of the payroll to the appropriate host system during the night after payroll is paid.

5. The method of claim 1, wherein the step of printing comprises the step of printing blocks on the face of the check designated for certain withholdings and printing the bar codes in a predetermined sequence on the check corresponding to the sequence in which the withholding amounts are micro-coded on the check.

6. A system for automatically transferring payroll withholdings comprising:

a plurality of bank checks each having printed thereon spaces for amounts for each of a plurality of withholdings associated with corresponding withholding accounts, and bar codes printed thereon for representing the particular withholding accounts corresponding to the spaces for the plurality of withholdings;

optically scanning means for scanning endorsed checks having micro-codes printed thereon representing data on the face of the check including the plurality of withholdings, for reading the micro-codes and bar codes and converting the micro-codes and bar codes to digital data;

processing means for processing the digital data to determine on the basis of the account number of the check, micro-codes and bar codes, the destination of a host system to which the withholding amounts for each withholding account are to be transferred, said processing means converting the withholding amount and withholding account information into a data format acceptable to each host system to which the withholding amounts are to be transferred; and means for electronically transferring the withholding amount and withholding account information to the appropriate host system.

7. The system of claim 6, wherein the bar codes are printed on the checks in ultraviolet ink so as to be invisible to the human eye but readable by an optical scanner.

8. A method of automatically transferring payroll withholdings for payroll paid by electronic direct deposit comprising the steps of:

deducting net payroll and withholdings from an employer's account;

accumulating withholding amounts for each withholding account for the entire portion of the payroll paid by direct deposit;

storing the destination of the host system corresponding to each withholding account for a particular employer;

electronically transferring the withholding amounts for each withholding account to the appropriate host system.

* * * * *